(12) United States Patent
Monden et al.

(10) Patent No.: US 7,025,795 B2
(45) Date of Patent: Apr. 11, 2006

(54) ELECTRODE FOR ELECTROLYTIC CAPACITOR, ELECTROLYTIC CAPACITOR, AND MANUFACTURING METHOD THEREFOR

(75) Inventors: Ryuji Monden, Nagano (JP); Atsushi Sakai, Nagano (JP); Yuji Furuta, Nagano (JP); Hideki Ohata, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/262,613

(22) Filed: Oct. 2, 2002

(65) Prior Publication Data

US 2003/0090859 A1    May 15, 2003

Related U.S. Application Data

(62) Division of application No. 09/598,914, filed on Jun. 22, 2000, now Pat. No. 6,483,694.

(60) Provisional application No. 60/141,248, filed on Jun. 30, 1999.

(30) Foreign Application Priority Data

Jun. 22, 1999   (JP) .................................. 11-175245

(51) Int. Cl.
*H01G 9/00* (2006.01)

(52) U.S. Cl. ...................................... 29/25.03; 427/80

(58) Field of Classification Search ..... 29/25.01–25.03
See application file for complete search history.

(56) References Cited

U.S. PATENT DOCUMENTS

| | | | | |
|---|---|---|---|---|
| 4,510,554 A | * | 4/1985 | Irikura | ........................ 361/540 |
| 4,603,087 A | | 7/1986 | Ema et al. | |
| 5,117,332 A | | 5/1992 | Kudoh et al. | |
| 5,119,274 A | | 6/1992 | Kinuta et al. | |
| 5,140,502 A | | 8/1992 | Kudoh et al. | |
| 5,187,639 A | | 2/1993 | Ogawa et al. | |
| 5,428,500 A | | 6/1995 | Hishiyama et al. | |
| 5,729,424 A | * | 3/1998 | Sharp et al. | ................. 361/273 |
| 5,914,852 A | | 6/1999 | Hatanaka et al. | |
| 6,042,740 A | | 3/2000 | Uehara et al. | |
| 6,072,694 A | | 6/2000 | Hahn et al. | |
| 6,381,121 B1 | * | 4/2002 | Monden et al. | .............. 361/525 |

FOREIGN PATENT DOCUMENTS

| | | |
|---|---|---|
| EP | 0514286 A1 | 3/1992 |
| JP | 2074021 | 3/1990 |
| JP | 4367210 | 12/1992 |
| JP | 5234821 | 9/1993 |
| JP | 5234822 | 9/1993 |

* cited by examiner

*Primary Examiner*—Ha Nguyen
(74) *Attorney, Agent, or Firm*—Sughrue Mion, PLLC

(57) ABSTRACT

An electrode for electrolytic capacitors having a large capacitance and having excellent tan δ, heat resistance, humidity resistance and stability. An electrolytic capacitor using the electrode. An electrode obtained by attaching a compound having a siloxane bond onto the surface of an electrode body comprising a valve-acting metal having formed thereon a dielectric film. The compound having a siloxane bond is attached by coating, dipping or vapor deposition. A solid electrolytic capacitor obtained by forming an electrolyte comprising an electrically conducting polymer on the electrode.

3 Claims, 1 Drawing Sheet

ELECTRODE FOR ELECTROLYTIC CAPACITOR, ELECTROLYTIC CAPACITOR, AND MANUFACTURING METHOD THEREFOR

CROSS REFERENCE TO RELATED APPLICATIONS

This is a divisional of application Ser. No. 09/598,914 filed Jun. 22, 2000 now U.S. Pat. No. 6,483,694, which claims benefit of Provisional Application No. 60/141,248 filed Jun. 30, 1999; the above noted prior applications are all hereby incorporated by reference.

FIELD OF THE INVENTION

The present invention relates to an electrode for electrolytic capacitors, an electrolytic capacitor using the electrode, and a manufacturing method therefor.

BACKGROUND OF THE INVENTION

To keep up with the recent trend toward reduction in the size and the weight of electronic equipment, a compact capacitor showing low impedance in the high frequency region and having a large capacitance is demanded. As a capacitor for use at high frequency, mica capacitor, film capacitor, ceramic capacitor and the like have been heretofore used. These capacitors are, however, not suitable for achieving a large capacitance. As a compact capacitor having a large capacitance, aluminum electrolytic capacitor and tantalum electrolytic capacitor are generally used.

The electrolyte used in these electrolytic capacitors is a liquid electrolyte or a solid manganese dioxide. In recent years, a capacitor where a TCNQ (7,7,8,8-tetracyanoquinodimethane) complex salt, which is an organic semiconductor, is used as the solid electrolyte has been proposed.

This capacitor is disadvantageous in that although the TCNQ complex salt is heated/melted, impregnated into an electrode and cooled/solidified to form a solid electrolyte, the TCNQ complex salt is likely to decompose and deteriorate at the melting temperature. Therefore, the production process thereof becomes very complicated and the cost increases.

In order to solve these problems, use of a solid electrolyte comprising a polymer of 5-membered heterocyclic compound having an electrical conductivity higher than the manganese dioxide or TCNQ complex salt, such as pyrroles, thiophenes and furans, have been proposed. A solid electrolytic capacitor using such an electrically conducting polymer has superior frequency properties compared with electrolytic capacitors using an electrolytic solution, because the electrically conducting polymer exhibits high electrical conductivity.

With respect to the surface treatment of electrochemically formed film (dielectric film) of the electrode, a method of allowing silicic acid or silicate to be present on the film surface to prevent deterioration in the capacitance and dielectric loss at high temperature and high humidity is known (see, JP-A-5-234821 (the term "JP-A" as used herein means an "unexamined published Japanese patent application") and JP-A-5-234822). However, this method is problematic with respect to humidity resistance.

Also, a solid electrolytic capacitor using a valve-acting metal having formed thereon a dielectric layer after surface treating the valve-acting metal by impregnating it with a silane coupling agent solution is known (JP-A-2-74021). The silane coupling agent is used in the form of an aqueous solution, and silanol is produced after hydrolysis and reacts by condensation with the hydroxyl group of the dielectric film to form a covalent bond. Therefore, heating is necessary. Furthermore, a thin film capacitor which is surface treated by dipping it in a solution of chlorosilane-based surfactant containing a fluorinated carbon chain (see, JP-A-4-36721) is known. In this technique, the chemical reaction group of the silane compound chemically bonds to the hydroxyl group of the dielectric film in a non-aqueous solvent system, and surface modification can be attained. However, HCl may be side produced to damage the dielectric film, and the reagent is expensive and readily reacts with water. As a result, this method is problematic with respect to profitability and stability of the reagent.

In the case of a solid electrolytic capacitor where the dielectric film on the valve-acting metal is an inorganic material and the electrolyte formed on the film is an electrically conducting polymer of an organic material, adhesion between the electrically conducting polymer and the dielectric film is weak and separation therebetween takes place very often at high temperatures. Accordingly, the capacitance disadvantageously decreases with time.

SUMMARY OF THE INVENTION

An object of the present invention is to provide an electrode suitable for electrolytic capacitors, preferably electrolytic capacitors using an electrically conducting polymer for the electrode, where the electrolytic capacitor has a large capacitance and high stability at high temperatures.

The present invention has been made to solve the above-described problems and fundamentally provides the following embodiments:

(1) an electrode for an electrolytic capacitor, obtained by attaching a compound having a siloxane bond onto an electrode comprising a valve-acting metal having on the surface thereof a porous dielectric film;

(2) a method for manufacturing an electrode for an electrolytic capacitor, comprising dipping an electrode comprising a valve-acting metal having on the surface thereof a porous dielectric film in a solution of a compound having a siloxane bond, or coating the solution on the electrode;

(3) a method for manufacturing an electrolytic capacitor, comprising exposing an electrode comprising a valve-acting metal having on the surface thereof a porous dielectric film to an atmosphere of a compound having a siloxane bond to attach said compound to the surface of the electrode;

(4) a solid electrolytic capacitor obtained by forming an electrolyte comprising an electrically conducting polymer on an electrode described in (1) above; and (5) a method for manufacturing an electrolytic capacitor, comprising attaching a compound having a siloxane bond onto a dielectric film of an electrode, comprising a valve-acting metal having on the surface thereof a porous dielectric film, with the end part thereof undertaking the anode part, forming in sequence an electrode on the dielectric film and further thereon an electrically conducting layer, thereby fabricating a capacitor device using these members as the cathode part, and connecting a lead frame to the anode part and the cathode part.

DESCRIPTION OF THE PREFERRED EMBODIMENTS

Figure 1:
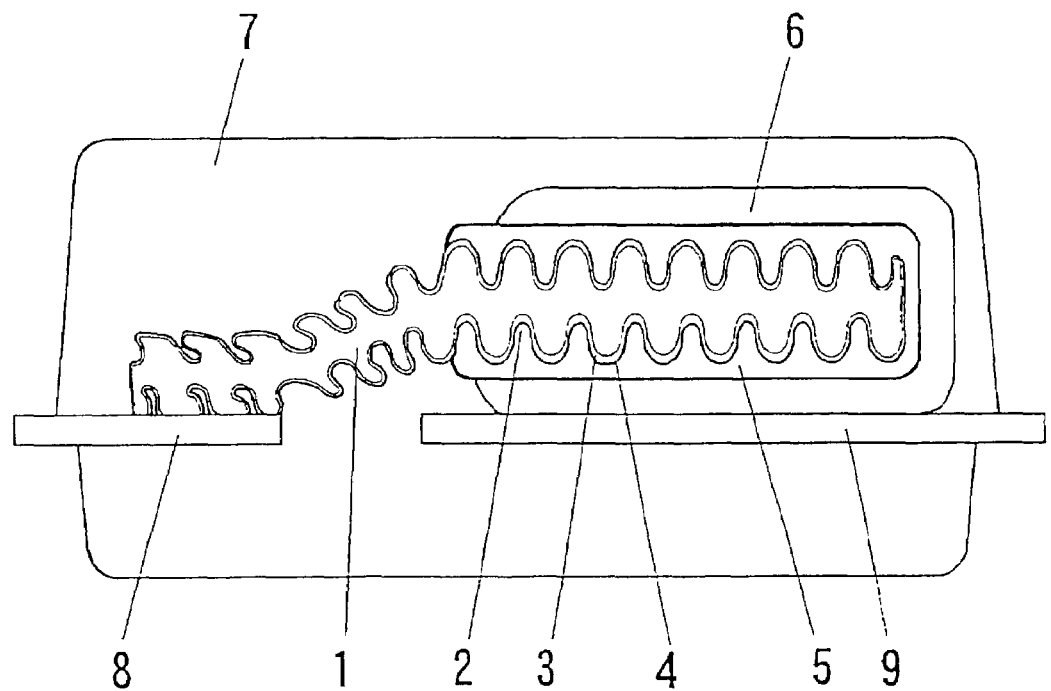
FIG. 1 is a cross section showing one example of the electrolytic capacitor of the present invention.

The electrode for electrolytic capacitors of the present invention is characterized in that a compound having a siloxane bond is attached to an electrode comprising a valve-acting metal having formed thereon a dielectric film. The electrode is suitably used for a solid electrolytic capacitor but may also be used for electrolytic capacitors using a liquid electrolyte.

The valve-acting metal used is a valve-acting metal such as aluminum, titanium, tantalum, niobium or an alloy mainly comprising one or more of these metals. The shape thereof may be any of foil, plate and bar. In the case of tantalum and/or niobium or an alloy thereof, the powder thereof may be molded and sintered.

The valve-acting metal is subjected to an etching or electrochemically forming treatment by a known method so as to form a dielectric layer on the valve-acting metal and increase the specific surface area.

Onto this dielectric film, a compound having a siloxane bond (hereinafter referred to as a "siloxane compound") is attached. The siloxane compound readily forms an intermolecular hydrogen bond between the siloxane bond in the molecule and the hydroxyl group on the oxide surface on the dielectric film, has affinity, and is maintained to adhere to the dielectric film. The present invention utilizes these properties. Accordingly, the siloxane compound may be any compound as long as it contains a siloxane bond. However, a low molecular weight siloxane (a cyclic or linear compound having a weight average molecular weight of 100,000 or less) is preferred. Examples of the siloxane compound product which can be used include silicone oil, silicone rubber, silicone resin and silicon varnish.

Trade names of siloxane compounds are specifically described below.

Cyclic Siloxane
  KF 994 and KF 995 produced by Shin-Etsu Chemical Co., Ltd.; and SIO 6705, SIT 7530, SIT 7900, SIT 8737, SID 4625 and SIH 6105 produced by Gelest Inc.

Organic Modified Silicone Oil
(1) Alkyl silicone oil
  KF 96, KF 69 and KF 54 produced by Shin-Etsu Chemical Co., Ltd.
(2) Fluorosilicone oil
  FMS-123 produced by Gelest Inc.
(3) Polyalkylene oxide-modified silicone
  DBE-712 produced by Gelest Inc.
(4) Hydroxy or Cation-type silicone
  CMS 626 produced by Gelest Inc. and KF 99 produced by Shin-Etsu Chemical Co., Ltd.
(5) Silanol silicone
  DMS-S12 produced by Gelest Inc.

Non-Reactive Silicone Oil
  KF 352 and KF 6012 as polyether-modified silicone, KF 410 as methylstyryl-modified silicone, KF 412 as alkyl-modified silicone, KF 910 as higher fatty acid ester-modified silicone, KF 905 as hydrophilic special silicone, KF 851 as higher alkoxy-modified silicone, and KF 100 as fluorine-modified silicone (all produced by Shin-Etsu Chemical Co., Ltd.).

Reactive Silicone Oil
(1) Vinyl silicone
  DMS-V00 produced by Gelest Inc.
(2) Amino-modified silicone
  KF 393, KF 860 (both produced by Shin-Etsu Chemical Co., Ltd.), DMS-A11 (produced by Gelest Inc.) and SF-8417 (produced by Dow Corning Toray Silicone Co., Ltd.).
(3) Epoxy-modified silicone
  KF 1001, KF 102 (both produced by Shin-Etsu Chemical Co., Ltd.) and DMS-E01 (produced by Gelest Inc.).
(4) Carboxyl-modified silicone
  X-22-3710, DMS-B12 (both produced by Gelest Inc.) and SF-8411 (produced by Dow Corning Toray Silicone Co., Ltd.).
(5) Carbinol-modified silicone
  KF 6001 (produced by Shin-Etsu Chemical Co., Ltd.) and DMS-C15 (produced by Gelest Inc.).
(6) Methacryl-modified silicone
  X-22-2404 and DMS-R01 (both produced by Gelest Inc.).
(7) Mercapto-modified silicone
  X-22-980 and SMS-022 (both produced by Gelest Inc.).

When attached onto the surface of dielectric film, the siloxane compound accelerates the formation of an electrically conducting polymer in fine pores of a dielectric film obtained by etching or the like, and exhibits excellent properties such as defoaming property, heat resistance, insulating property, chemical resistance and chemical stability. As a result of the presence of the siloxane compound, the degree of adhesion between the dielectric film and the electrically conducting polymer can be increased, which results in higher capacitance of the capacitor and smaller tangent ($\tan \delta$) of the loss angle.

A first method for attaching a siloxane compound onto the dielectric film of an electrode is a method of coating a solution (including a dispersion solution) of siloxane compound on the film or dipping the electrode in the siloxane compound-containing solution. Examples of the solvent for the solution include ethers such as tetrahydrofuran (THF), dioxane and diethyl ether, aprotic polar solvents such as dimethylformamide (DMF), acetonitrile, benzonitrile, N-methylpyrrolidone (NMP) and dimethylsulfoxide (DMSO), esters such as ethyl acetate and butyl acetate, non-aromatic chlorine-based solvents such as chloroform and methylene chloride, nitro compounds such as nitromethane, nitroethane and nitrobenzene, alcohols such as methanol, ethanol and propanol, acetone and water. In the solvent, the siloxane compound is present in a concentration of from about 0.0001 to 1.0 wt %, preferably from about 0.001 to 0.5 wt %.

A second method for attaching a siloxane compound is a method of exposing the electrode to an atmosphere of siloxane compound to attach the compound onto the electrode surface. In this case, for example, when silicone rubber is used, it converts into a siloxane compound having a silicon number shown in the Examples. After the attachment, however, this does not cause any trouble as long as the compound has a siloxane bond.

By these methods, a siloxane compound can be substantially attached even into fine pores of the dielectric film. The term "substantially" as used herein means that, for example, the amount of siloxane compound attached to the dielectric film may be small to an extent such that the siloxane compound can be detected in the region of about 100 Å in the depth direction of the dielectric film layer by an X-ray photoelectron spectrum (XPS) or can be detected by an Auger electron spectrum (AES). The siloxane compound may be attached either uniformly or non-uniformly.

A solid electrolytic capacitor using the above-described electrode of the present invention is described below. FIG.

1 shows one example of the solid electrolytic capacitor of the present invention. On a valve-acting metal 1, a dielectric film 3 and fine pores 2 are formed. Onto the film, a siloxane compound 4 is attached into inside of fine pores.

On the thus-constructed electrode of the present invention, an electrically conducting polymer 5 is formed. The electrically conducting polymer used is a polyaniline and 5-membered heterocyclic electrically conducting polymer such as polypyrrole, polythiophene and polyfuran, or substituted derivatives thereof, preferably poly(3,4-ethylenedioxythiophene). The polymerization may be either electrolytic polymerization or chemical polymerization. However, chemical polymerization by adding an oxidizing agent to a solution having dissolved or dispersed therein monomers constituting the polymer is preferred. The solvent used for dissolving the monomers is the same as the above-described solvent for use in dissolving or dispersing isopropyl alcohol or siloxane compound. Examples of the oxidizing agent used for the chemical polymerization include persulfates such as potassium persulfate, sodium persulfate and ammonium persulfate, peroxides such as hydrogen peroxide, and metal halides such as ferric chloride and aluminum chloride. Among these, ammonium persulfate is preferred.

In the electrically conducting polymer for use in the solid electrolytic capacitor, a dopant is generally used. Depending on the kind of dopant, the surface of the electrically conducting polymer is usually varied in the flatness, roughness and the like. As a result, the the electrically conducting polymer coating on the dielectric film greatly varies. For the electrically conducting polymer used in a solid electrolytic capacitor, an aryl sulfonate-based dopant is generally used. When, for example, a sodium salt of benzenesulfonic acid, toluenesulfonic acid, naphthalenesulfonic acid or anthracenesulfonic acid is used, the covering state of the electrically conducting polymer produced on the electrode varies among respective cases and in turn the capacitance differs. However, by attaching a siloxane compound to the dielectric film, an adhesion effect is provided between the polymer and the dielectric film and thereby the difference in the covering state of polymer depending on the kind of dopant is reduced. As a result, a uniform polymer can be obtained.

The electrically conducting polymer may be formed on the dielectric film having attached thereto a siloxane compound by a method where a monomer of the electrically conducting polymer is coated on the film using the monomer alone or after dissolving or dispersing it in a solvent, or the film may be dipped in the monomer solution, to uniformly disperse the monomer on the dielectric film. Then the film is dipped in a solution or dispersion solution containing, for example, an oxidizing agent in an amount of from 0.01 to 2 mol/l and a dopant in an amount of from 0.01 to 2 mol/l to cause chemical polymerization. The electrically conducting polymer may also be similarly formed by chemical polymerization even when (1) the coating of or dipping in the solution or dispersion solution containing the monomer and (2) the coating of or dipping in the solution or dispersion solution containing an oxidizing agent and a dopant are performed in the reverse order or performed simultaneously in one solution. The polymerization temperature is generally from −70 to 250° C., preferably from 0 to 150° C., more preferably from 0 to 100° C.

On the thus-formed electrically conducting polymer, another electrically conducting layer is preferably provided to further improve the electrical contact. This electrically conducting layer 6 is formed using, for example, an electrically conducting paste layer such as known carbon paste and silver paste, plating, metallization or an electrically conducting resin film. Furthermore, on this electrically conducting layer, an outer jacket 7 is provided by resin molding, by using a resin case or metal-made case, or by resin dipping. Thereafter, a connection terminal (anode) 8 and a connection terminal (cathode) 9 are provided thereto. Then, an electrolytic capacitor product suitable for various uses can be manufactured. In FIG. 1, one constituent unit of the electrolytic capacitor is shown and on actual use as a product, a plurality of the constituent units (capacitor elements) are generally stacked.

EXAMPLES

The present invention is described in greater detail below by referring to Examples and Comparative Examples. Unless otherwise indicated, all parts, percents, ratios and the like are by weight.

Example 1

A formed aluminum foil was subjected to electrochemical forming at 13 V by dipping the foil in a 10 wt % aqueous ammonium adipate solution to form a dielectric film on the foil surface. This formed aluminum foil (substrate) was placed together with a high-temperature vulcanization-type silicone rubber (heat resistant temperature: 250° C.) in a drier (volume: 91 l) at about 180° C. and kept for about 1 hour to attach a siloxane compound onto the film. This siloxane compound was examined by a gas chromatographic mass spectrometry (GC-MS) and found to have a siloxane bond represented by the formula: [—O—$SiR^1R^2$—]n (wherein $R^1$ and $R^2$ both are $CH_3$). The majority of the compounds were compounds where n is from 7 to 16. Subsequently, the formed foil was dipped in an isopropyl alcohol (hereinafter simply referred to as "IPA") solution containing 1.2 mol/l of 3,4-ethylenedioxythiophene (produced by Bayer AG) and then dipped in an aqueous solution prepared to have an ammonium persulfate (hereinafter simply referred to as "APS") concentration of 2 mol/l and a sodium anthraquinone-2-sulfonate concentration of 0.07 wt %.

The substrate was taken out and left standing in air at about 40° C. for about 10 minutes to allow the oxidative polymerization to proceed. This step was repeated 25 times. After this polymerization reaction, the substrate was washed.

Thereafter, generally known carbon paste (graphite powder+epoxy resin+acetic ester as the solvent) and silver paste (silver powder+epoxy resin+the same solvent) were coated in this order on the capacitor element (polymerization reaction area: 3×4 mm). Four sheets of capacitor elements were stacked one on another, connected on a lead frame and bonded to a cathode lead terminal. The electric current from the anode of the elements was collected by welding the aluminum core part of the substrate to an electrode lead terminal. Finally, the whole was molded with epoxy resin to manufacture an electrolytic capacitor. The thus-obtained capacitor was aged for 2 hours by applying thereto a rated voltage at 125° C. and then measured on the initial properties. In an accelerated humidity test, the capacitor was left standing in high temperature and high humidity conditions of 85° C. and 85% relative humidity (RH) for 240 hours.

In Table 1, initial properties are shown, where C indicates a capacitance and DF indicates a tangent of loss angle (DF=tan δ×100%), each measured at 120 Hz. LC (leakage current) and short circuit tests were measured 1 minute after the application of rated voltage (13 V). Respective measured values were an average of 30 units of samples. The sample was determined as defective when LC was 1 µA or more, and the sample was determined as a short circuited product when LC was 10 µA or more. The average of LC was calculated excluding short circuited products, if present. The results obtained are shown together in Table 1.

Example 2

Capacitors were manufactured and evaluated in the same manner as in Example 1 except that sodium 4-morpholinepropanesulfonate was used in place of sodium anthraquinone-2-sulfonate in Example 1. The results obtained are shown in Table 1.

Example 3

Capacitors were manufactured and evaluated in the same manner as in Example 1 except that sodium anthracene-1-sulfonate was used in place of sodium anthraquinone-2-sulfonate in Example 1. The results obtained are shown in Table 1.

Example 4

Capacitors were manufactured and evaluated in the same manner as in Example 1 except that sodium 1-naphthalenesulfonate was used in place of sodium anthraquinone-2-sulfonate and pyrrole was used in place of 3,4-ethylenedioxythiophene in Example 1. The results obtained are shown in Table 1.

Example 5

The formed aluminum foil (substrate) obtained in Example 1 was placed in a drier (volume: 91 l) having charged thereinto 6 g of octamethylcyclotetrasiloxane (produced by Aldrich Chemical Co., Inc.) and heated at 40° C. After 5 minutes, the substrate was taken out.

Capacitors obtained through the same subsequent procedure as in Example 1 were evaluated in the same manner as in Example 1. The results are shown in Table 1.

Example 6

The formed aluminum foil (substrate) obtained in Example 1 was placed in a drier (volume: 91 l) in which 6 g of hexamethylcyclotrisiloxane (produced by Gelest Inc.) was charged and allowed to stand at 20° C. After 5 minutes, the substrate was taken out.

Capacitors obtained through the same subsequent procedure as in Example 1 were evaluated in the same manner as in Example 1. The results are shown in Table 1.

Example 7

The formed aluminum foil (substrate) obtained in Example 1 was dipped in a 0.1 wt % hexamethylcyclotrisiloxane solution dissolved in acetone and then dried at 50° C. for 10 minutes. Evan after drying at this temperature, hexamethylcyclotrisiloxane remained. It is considered that intermolecular hydrogen bonding was generated with the dielectric material.

Capacitors obtained through the same subsequent procedure as in Example 1 were evaluated in the same manner as in Example 1. The results are shown in Table 1.

Example 8

The formed aluminum foil (substrate) obtained in Example 1 was dipped in a 0.001 wt % decamethylcyclopentasiloxane (produced by Chisso K. K.) solution dissolved in acetone and then dried at 50° C. for 10 minutes.

Capacitors obtained through the same subsequent procedure as in Example 1 were evaluated in the same manner as in Example 1. The results are shown in Table 1.

Example 9

The formed aluminum foil (substrate) obtained in Example 1 was dipped in a 0.1 wt % dimethylsilicone oil (KF-96, trade name, produced by Shin-Etsu Chemical Co., Ltd.) solution dissolved in acetone and then dried at 50° C. for 10 minutes.

Capacitors obtained through the same subsequent procedure as in Example 1 were evaluated in the same manner as in Example 1. The results are shown in Table 1.

Comparative Example 1

Capacitors were obtained by the same treatment as in Example 1 except for omitting the attachment of a siloxane compound using silicone rubber in Example 1 and evaluated in the same manner as in Example 1. The results are shown in Table 1.

Comparative Example 2

Capacitors were obtained by the same treatment as in Example 3 except for omitting the attachment of a siloxane compound using silicone rubber in Example 3 and evaluated in the same manner as in Example 3. The results are shown in Table 1.

Comparative Example 3

Capacitors were obtained by the same treatment as in Example 4 except for omitting the attachment of a siloxane compound using silicone rubber in Example 4 and evaluated in the same manner as in Example 4. The results are shown in Table 1.

TABLE 1

|  | Initial Properties | | | | | Accelerated Humidity Test |
| --- | --- | --- | --- | --- | --- | --- |
|  | C µF, 120 Hz | DF %, 120 Hz | LC µA | Defective/ Sample, units/units | Short Circuited Product | Defective/ Sample, units/units |
| Example 1 | 53 | 0.6 | 0.2 | 0/30 | 0 | 0/30 |
| Example 2 | 52 | 0.6 | 0.2 | 0/30 | 0 | 0/30 |
| Example 3 | 52 | 0.6 | 0.2 | 0/30 | 0 | 0/30 |
| Example 4 | 51 | 0.6 | 0.2 | 0/30 | 0 | 0/30 |
| Example 5 | 52 | 0.6 | 0.2 | 0/30 | 0 | 0/30 |
| Example 6 | 52 | 0.6 | 0.2 | 0/30 | 0 | 0/30 |
| Example 7 | 52 | 0.6 | 0.2 | 0/30 | 0 | 0/30 |

TABLE 1-continued

|  | Initial Properties | | | | | Accelerated Humidity Test |
| --- | --- | --- | --- | --- | --- | --- |
|  | C μF, 120 Hz | DF %, 120 Hz | LC μA | Defective/ Sample, units/units | Short Circuited Product | Defective/ Sample, units/units |
| Example 8 | 52 | 0.6 | 0.2 | 0/30 | 0 | 0/30 |
| Example 9 | 52 | 0.6 | 0.2 | 0/30 | 0 | 0/30 |
| Comparative Example 1 | 48 | 0.7 | 0.2 | 0/30 | 0 | 5/30 |
| Comparative Example 2 | 48 | 0.7 | 0.2 | 0/30 | 0 | 4/30 |
| Comparative Example 3 | 47 | 0.7 | 0.2 | 0/30 | 0 | 6/30 |

According to the present invention, a compound containing a siloxane bond is attached onto an electrode comprising a valve-acting metal having on the surface a fine porous dielectric film so that an electrolytic capacitor, particularly a solid electrolytic capacitor, with improved adhesion between the dielectric film and the electrically conducting polymer provides a large capacitance and good reliability under high temperature and high humidity conditions, can be obtained.

Furthermore, a compact and high-performance electrolytic capacitor improved in high frequency properties and tan δ and exhibiting low impedance can be obtained.

While the invention has been described in detail and with reference to specific embodiments thereof, it will be apparent to one skilled in the art that various changes and modifications can be made therein without departing from the spirit and scope thereof.

What is claimed is:

1. A method for manufacturing an electrode for an electrolytic capacitor, comprising first dipping an electrode comprising a valve-acting metal having on a surface thereof a porous inorganic dielectric film in a solution of a compound having a siloxane bond, or coating said solution on said electrode, such that the compound having a siloxane bond is substantially attached into fine pores of the dielectric film, and then forming a layer of an electrolyte comprising an electrically conducting polymer on the dielectric film having substantially attached thereto the compound having a siloxane bond, wherein said solution does not comprise an oxidizing agent or a monomer.

2. The method of claim 1, wherein said solution consists essentially of the compound having a siloxane bond.

3. The method of claim 1, wherein said solution consists of the compound having a siloxane bond and a solvent.

* * * * *